US009327723B2

(12) United States Patent
Kang et al.

(10) Patent No.: US 9,327,723 B2
(45) Date of Patent: May 3, 2016

(54) METHOD AND SYSTEM FOR CONTROLLING HYBRID ELECTRIC VEHICLE

(71) Applicants: Hyundai Motor Company, Seoul (KR); Kia Motors Corporation, Seoul (KR)

(72) Inventors: Seung Jae Kang, Seoul (KR); Jong Hyun Kim, Gyeonggi-Do (KR); Hak Sung Lee, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/551,026

(22) Filed: Nov. 23, 2014

(65) Prior Publication Data
US 2016/0001773 A1 Jan. 7, 2016

(30) Foreign Application Priority Data
Jul. 4, 2014 (KR) ........................ 10-2014-0083937

(51) Int. Cl.
*B60L 9/00* (2006.01)
*B60W 20/00* (2016.01)
*B60W 10/08* (2006.01)
*B60W 10/30* (2006.01)

(52) U.S. Cl.
CPC ............... *B60W 20/50* (2013.01); *B60W 10/08* (2013.01); *B60W 10/30* (2013.01); *B60W 2510/087* (2013.01); *B60W 2710/083* (2013.01); *B60W 2710/30* (2013.01); *Y10S 903/93* (2013.01)

(58) Field of Classification Search
CPC ..... B60W 10/11; B60W 20/00; B60W 10/08; B60W 10/30; F16H 61/0028
USPC ........................... 701/22; 180/65.265, 65.275
See application file for complete search history.

(56) References Cited

U.S. PATENT DOCUMENTS

| 7,730,982 B2 * | 6/2010 | Hidaka et al. ............ B60K 6/48 180/292 |
| 2002/0107103 A1 * | 8/2002 | Nakamori et al. ..... B60K 6/365 475/116 |
| 2005/0103544 A1 * | 5/2005 | Takami et al. ......... B60K 6/365 180/65.235 |

FOREIGN PATENT DOCUMENTS

| JP | 09-065501 A | 3/1997 |
| JP | 2012-057688 A | 3/2012 |
| JP | 4948204 | 6/2012 |
| JP | 2013-068267 A | 4/2013 |
| JP | 2013-185497 A | 9/2013 |
| KR | 10-2011-0059696 | 6/2011 |
| KR | 10-2011-0107975 | 10/2011 |
| KR | 10-2012-0063258 | 6/2012 |

* cited by examiner

Primary Examiner — Gertrude Arthur Jeanglaude
(74) Attorney, Agent, or Firm — Mintz Levin Cohn Ferris Glovsky and Popeo, P.C.; Peter F. Corless

(57) ABSTRACT

A system for controlling a hybrid electric vehicle includes a control unit for determining whether or not an Oil Pump Unit (OPU) and an Electric Oil Pressure (EOP) temperature sensor are normally operated; a phase current density comparison unit for comparing the mean density of phase currents acquired after shifting the gears of the vehicle with the density of coil phase currents which flow through a coil at a maximum permissible temperature at which the coil is not burning; and a torque control unit for controlling the value of torque to be applied to a transmission according to a result acquired by the phase current density comparison unit.

12 Claims, 5 Drawing Sheets

<GRAPH 1>

<GRAPH 2>

<TABLE 1>

| | LOAD [Nm]<br>(REQUIRED OPERABLE TIME PERIOD) | | DENSITY OF CURRENTS<br>[Arms/mm^2] |
|---|---|---|---|
| Load condition 1 | 7 | (OPERATES FOR 30 SECONDS) | 17.2 |
| Load condition 2 | 5.5 | (OPERATES FOR 120 SECONDS) | 12.8 |
| Load condition 3 | 4 | (OPERATES CONTINUOUSLY) | 5.4 |
| Load condition 4 | 2 | (OPERATES CONTINUOUSLY) | 4.0 |

METHOD AND SYSTEM FOR CONTROLLING HYBRID ELECTRIC VEHICLE

CROSS REFERENCE TO RELATED APPLICATION

The present application claims under 35 U.S.C. §119(a) the benefit of Korean Patent Application No. 10-2014-0083937, filed Jul. 4, 2014, which is incorporated by reference herein in its entirety.

BACKGROUND

1. Field of the Invention

The present invention relates, in general, to a method and system for controlling a hybrid electric vehicle, and more particularly, to a method and system for controlling a hybrid electric vehicle which, when failure has occurred in an EOP temperature sensor and torque to be applied to a transmission is controlled to protect the transmission, can actively control the range of torque to be applied to the transmission according to a gear shift state, instead of controlling the range of torque to be applied to the transmission at a predetermined level, by comparing the density of phase currents with the density of coil phase currents acquired when currents which do not cause a coil to burn.

2. Description of the Related Art

First, for better understanding of the present invention, a general hybrid electric vehicle will be schematically described as follows:

A hybrid electric vehicle is a vehicle which uses an engine and a motor as driving sources, and is capable of reducing exhaust gas and improving fuel efficiency. The hybrid electric vehicle includes an engine and a drive motor configured to function as driving sources for the vehicle, an engine clutch interposed between the engine and the drive motor, a transmission connected to the output side of the drive motor and configured to transmit power to a drive shaft, a battery configured to function as a power source (electric power source) for the drive motor, and an inverter configured to control the drive of the drive motor.

The hybrid electric vehicle is mounted with a Hybrid Control Unit (HCU) for generally controlling the vehicle and other various control units for controlling the respective devices of the vehicle.

For example, the hybrid electric vehicle includes an Engine Control Unit (ECU) for controlling the operation of the engine, a Motor Control Unit (MCU) for controlling the operation of the drive motor, a Transmission Control Unit (TCU) for controlling the operation of the transmission, a Battery Management System (BMS) for controlling the operation of the battery while monitoring the state of the battery, and a Full Auto Temperature Controller (FATC) for controlling the indoor temperature of the vehicle.

Further, the HCU, which is the highest-level control unit, performs cooperative control with the control units, such as the ECU, the MCU, the TCU, the BMS, and the FATC for controlling the respective devices by transmitting and receiving information with each other through Controller Area Network (CAN) communication. High-level control units transmit commands, such as a control signal, to lower-level control units while collecting various information from the lower control units.

The hybrid electric vehicle further includes an Electric Oil Pump (EOP) for supplying working fluids required for driving the engine clutch and the transmission, and an Oil Pump Unit (OPU) including a pump control unit for controlling the operation of the EOP and a relay for controlling the supply of electric power to the EOP.

The pump control unit of the OPU is provided to transmit and receive information to and from the TCU which is the high-level control unit through the CAN communication, and is configured to electrically control the operation of the EOP based on a control signal applied from the TCU.

The EOP includes a motor and a pump in general, and drives the pump using the power of the motor.

The OPU performs a function of driving the EOP by controlling the supply of electric power to the EOP as described above. When the EOP is overloaded, the OPU performs a function of controlling the torque of the EOP by raising the value of phase currents such that the EOP can spin after coping with the overloads.

An EOP temperature sensor measures the temperature of the most heated coil inside the motor, and the OPU constructs a regular protection logic using a Phase Current Sensor (CS) in order to protect an internal power module.

In particular, a coil may be burning under a high load condition because the coil is rapidly heated and the temperature of the coil deviates from temperature at which the coil can stand. Conventionally, a coil is prevented from being burning in such a way that the OPU continuously monitors the temperature of the coil and reduces the output of the EOP when the temperature of the coil reaches regular temperature before the temperature of the coil deviates from the temperature at which the coil can stand.

The EOP is mounted with a temperature sensor inside in order to prevent main elements from being burning because the motor is heated due to overcurrent, and is configured to perform a regular control logic function to protect the EOP or peripheral equipment using a signal received from the temperature sensor.

In a case of single EOP driving system, the torque to be applied to a transmission is limited to a regular value or less in order to protect the transmission when the temperature sensor is broken down.

In particular, since the torque to be applied to the transmission is uniformly limited to a regular value without taking a vehicle's traveling step (before and after shifting gear stages) into consideration, the range of the torque which can be applied to the transmission is limited when failure has occurred in the temperature sensor, and thus a problem occurs in that the total vehicle efficiency and shifting smoothness are decreased.

As related technology, a conventional art entitled "Device and Method for Controlling Oil Pump of Hybrid Electric Vehicle" and another conventional art entitled "Method for Driving Oil Pump for Hybrid Electric Vehicle" are disclosed. However, in a case of "Device and Method for Controlling Oil Pump of Hybrid Electric Vehicle", power required to control an electric oil pump is determined based on oil temperature and change in line pressure according to the requested torque, and thus an advantage is realized in that the speed of revolution of the electric oil pump can be actively controlled. However, there is a limit in that it is difficult to actively control the torque to be applied to the transmission using the phase current sensor as in the present invention. In a case of the "Method for Driving Oil Pump for Hybrid Electric Vehicle", it is possible to continuously drive a motor even when failure has occurred in a state in which the TCU is communicated with the OPU, and thus the durability of a device is improved. However, there is also a limit in that it is difficult to actively control the torque to be applied to the transmission using the phase current sensor as in the present invention.

The contents, described as related art, are only intended to provide an understanding of the background of the present invention, and should not be understood that the present invention corresponds to already-known related art by those skilled in the art.

SUMMARY

Accordingly, an object of the present invention is to provide a method and system for controlling a hybrid electric vehicle in which the torque within a range wider than a conventional range can be applied to a transmission even in a case of a "fail-safe" vehicle by measuring phase currents using an Oil Pump Unit (OPU) phase current sensor when failure has occurred in an internal temperature sensor of an Electric Oil Pump (EOP) and controlling the torque to be applied to the transmission for a predetermined time period during which the density of phase currents based on the measured phase currents is equal to or higher than a predetermined value.

A method for controlling a hybrid electric vehicle is proposed.

In particular, the present invention provides a method for controlling a hybrid electric vehicle, including determining whether or not an Electric Oil Pump (EOP) temperature sensor is normally operated when an Oil Pump Unit (OPU) is normally operated; comparing a mean density of phase currents acquired after shifting gears of the vehicle with a density of coil phase currents which flow through a coil at a maximum permissible temperature at which the coil is not burning; and controlling a value of torque to be applied to a transmission according to a result of comparing the mean density of phase currents with the density of coil phase currents.

Controlling the value of torque may include applying an unrestricted amount of torque to the transmission when the mean density of phase currents acquired after shifting the gears of the vehicle is less than the density of coil phase currents.

Controlling the value of torque may include applying an unrestricted amount of torque to the transmission for a set permissible time period when the mean density of phase currents acquired after shifting the gears of the vehicle is greater than the density of coil phase currents.

The permissible time period may be a time period taken to reach the maximum permissible temperature, at which the coil is not burning, from a set reference temperature.

The reference temperature may include one of a temperature on which the coil converges when the density of phase currents based on a value of phase currents acquired when the gears are shifted from a Drive (D) stage to a Reverse (R) stage is applied to the coil, and the temperature on which the coil converges when the density of phase currents based on the value of phase currents acquired before shifting the gears is applied to the coil.

The method may further include controlling the torque to be applied to the transmission by imposing a restriction such that the mean density of phase currents acquired after shifting the gears of the vehicle is less than the density of coil phase currents using the OPU when a time period during which the mean density of phase currents acquired after shifting the gears of the vehicle is applied to the coil is longer than the permissible time period.

The method may further include imposing a restriction such that torque less than loads given to the EOP is applied when the density of coil phase currents is applied to the coil using the OPU.

The method may further include restricting the torque for a time period during which the torque to be applied to the transmission is less than loads acquired when the vehicle generally travels.

A system for controlling a hybrid electric vehicle is proposed.

For this, the present invention provides a system for controlling a hybrid electric vehicle, including a control unit for determining whether or not an OPU and an EOP temperature sensor are normally operated; a phase current density comparison unit for comparing a mean density of phase currents acquired after shifting gears of the vehicle with a density of coil phase currents which flow through a coil at a maximum permissible temperature at which the coil is not burning; and a torque control unit for controlling a value of torque to be applied to a transmission according to a result acquired by the phase current density comparison unit.

The torque control unit may transmit a restriction signal to the OPU such that the torque to be applied to the transmission is not restricted when the mean density of phase currents acquired after shifting the gears of the vehicle is less than the density of coil phase currents and such that the torque to be applied to the transmission is not restricted for a set permissible time period when the mean density of phase currents acquired after shifting the gears of the vehicle is greater than the density of coil phase currents.

The permissible time period may be a time period taken to reach the maximum permissible temperature at which the coil is not burning from a set reference temperature, and the reference temperature may include one of the temperature on which temperature of the coil converges when the density of phase currents based on a value of phase currents acquired when the gears are shifted from a D stage to an R stage is applied to the coil, and the temperature on which the temperature of the coil converges when the density of phase currents based on the value of phase currents acquired before shifting the gears is applied to the coil.

The torque to be applied to the transmission may be controlled by imposing a restriction such that the mean density of phase currents acquired after shifting the gears of the vehicle is less than the density of coil phase currents using the OPU when a time period during which the mean density of phase currents acquired after shifting the gears of the vehicle is applied to the coil is longer than the permissible time period, a restriction may be imposed such that torque less than loads given to the EOP is applied when the density of coil phase currents is applied to the coil using the OPU, and the torque may be restricted for a time period during which the torque to be applied to the transmission is less than loads acquired when the vehicle generally travels.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
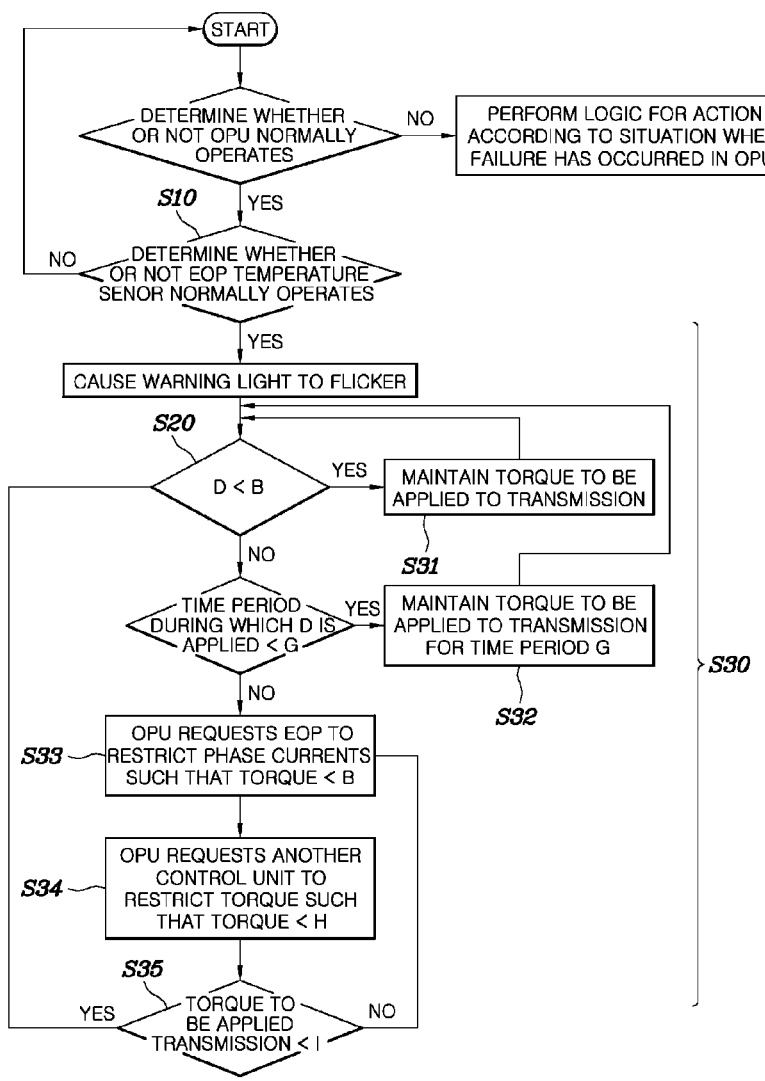
FIG. 1 is a flowchart illustrating a method for controlling a hybrid electric vehicle according to the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of a method and system for controlling a hybrid electric vehicle according to the present invention will be described in detail with reference to the attached drawings.

Reference now should be made to the drawings, in which the same reference numerals are used throughout the different drawings to designate the same or similar components.

FIG. 1 is a flowchart illustrating the method for controlling a hybrid electric vehicle according to the present invention.

As shown in the drawing, the present invention includes: determining whether or not an Electric Oil Pump (EOP) temperature sensor is normally operated when an Oil Pump Unit (OPU) is normally operated at step S10; comparing the mean density of phase currents acquired after shifting the gears of the vehicle with the density of coil phase currents which flow through a coil at the maximum permissible temperature at which the coil is not burning at the phase current density comparison step S20; and controlling the value of torque to be applied to a transmission according to a result, acquired at phase current density comparison step, at step S30.

First, when the OPU is normally operated, it is determined whether or not the EOP temperature sensor is normally operated.

It may be determined whether or not the OPU is normally operated using various logic functions. Although not shown in FIG. 1, a Transmission Control Unit (TCU) may check whether or not failure has occurred in the OPU. Failure which has occurred in the OPU is detected through a self-diagnostic logic inside the OPU, a signal according to a result of the diagnosis is transmitted to the TCU, and thus the TCU determines whether or not failure has occurred in the OPU.

When failure which has occurred in the OPU is detected, the TCU transmits a signal for causing a vehicle to travel in a limp home mode while preventing the damage of transmission components, such as the clutch and brake of the vehicle, to control units, such as a Hybrid Control Unit (HCU), an Engine Control Unit (ECU), and a Motor Control Unit (MCU), via CAN communication. In particular, the TCU performs a logic function for an action according to a situation when failure has occurred in the OPU.

When the OPU is normally operated, it is determined whether or not a temperature sensor installed inside the EOP is normally operated at step S10. If a general temperature pattern inside the EOP is not formed, that is, a temperature signal sensed by the temperature sensor is not detected or a temperature signal within a specific range is detected, it may be determined that failure has occurred in the EOP temperature sensor.

If it is determined that failure has occurred in the temperature sensor installed inside the EOP, a warning light provided on one side of a driver's seat, such as a cluster inside a vehicle, is flickered such that a driver can notice.

If it is determined that the OPU normally operates and failure has occurred in the EOP temperature sensor, the mean density of phase currents acquired after shifting the gears of the vehicle is compared with the density of coil phase currents which flow through the coil at the maximum permissible temperature at which the coil is not burning at phase current density comparison step S20.

The mean density of phase currents acquired after shifting the gears of the vehicle may be measured by measuring the value of phase currents acquired when the gears are shifted using an OPU phase current sensor and dividing the mean value of the value of the measured phase currents by the cross-sectional area of the coil.

Further, when the temperature in the coil rises, the maximum permissible temperature at which the coil is not burning exists. The density of coil phase currents may be acquired using the value of phase currents which flow through the coil when the temperature converges on the maximum permissible temperature, similarly to the method for acquiring the mean density of phase currents acquired after shifting the gears of the vehicle.

The mean density of phase currents acquired after shifting the gears of the vehicle is compared with the density of coil phase currents which flow through the coil at the maximum permissible temperature at which the coil is not burning According to a result of the comparison, the torque to be applied to the transmission value is controlled at step S30.

The relationship between the value of currents which flow through the coil and a time period during which the vehicle can travel (permissible time period) will be described with reference to FIG. 2 attached for better understanding of the present invention.

As described above, when the EOP is overloaded, the OPU performs control such that the EOP can overcome the overloads applied to the EOP and can rotate with larger torque by increasing the value of phase currents.

However, if the value of phase currents increases and the value of currents which flow through the coil increases, heat is generated from the coil in proportion to square. Further, if the value of phase currents increases and the density of phase currents (the value of phase currents/the cross-sectional area of the coil) increases, the temperature within the coil also rises in proportion to square ($P=VI=I^2R$).

Figure 2:
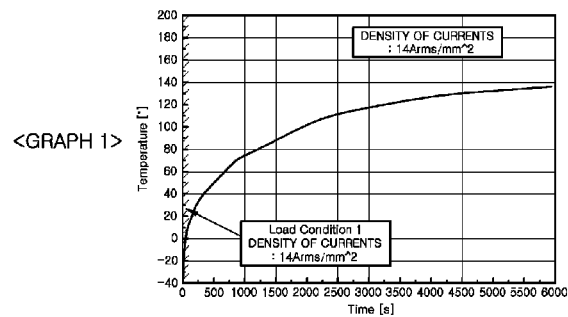
FIG. 2 is graph and a table illustrating the relationship between the value of currents which flow through a coil and time that a vehicle can travel.
Figure 2:
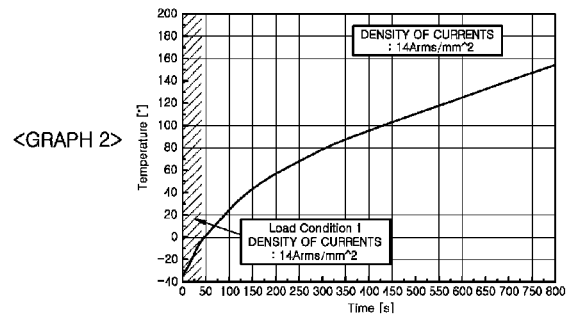

<Graph 1> and <Graph 2> shown in FIG. 2 illustrate change in the temperature of a coil according to the elapse of time when the density of phase currents which flow through the coil is uniform. In a case of <Graph 1>, it can be seen that the temperature of the coil converges around 140° C. when the density of phase currents is 11.3 Arms/mm². If the value of phase currents is measured by the phase current sensor, the density of phase currents may be acquired and the converging temperature of the coil according to the density of phase currents may be acquired.

Based on this, if the maximum permissible temperature at which the coil is not burning is 180° C., the coil is not burning when the density of phase currents which flow through the coil is 11.3 Arms/mm², and thus it is possible to continuously drive the vehicle without performing control such that the value of the torque to be applied to the transmission is reduced.

As in <Graph 2>, if the density of phase currents based on regular value phase currents which flow through the coil is 14 Arms/mm², the temperature in the coil successively increases over 180° C. which is the maximum permissible temperature of the coil. In this case, a threshold in which the coil is not burning is exceeded.

In this case, it is necessary to control the torque to be applied to the transmission.

<Table 1> illustrates the value of the density of phase currents according to the condition of loads given to the EOP and an operable time period (permissible time period) during which the vehicle can travel within a limit in which the coil is not burning. If a maximum load of 7 Nm is generated under the worst condition (extremely low temperature or reverse climbing) of the vehicle, it can be seen that the vehicle can travel for maximum 30 seconds.

When the density of phase currents increases and the coil is burning, it is difficult to understand the current temperature of the coil, and thus it is difficult to understand the value of phase currents, which deviates from the maximum permissible temperature at which the coil is not burning, or the maximum vehicle operable time period (permissible time period) for the density of phase currents.

However, after the value of phase currents acquired immediately before the maximum load is generated (for example, gear stages are changed to an R stage when the vehicle is traveling in a D stage) is measured using the phase current sensor, and the converging temperature of the coil may be acquired using the value of the density of phase currents based on the measured value of phase currents.

In particular, if the temperature, acquired when the value of phase currents which deviate from the limit temperature at which the coil can stand is applied, is set to reference temperature, the vehicle may travel without controlling the value of torque to be applied to the transmission during a time period taken to reach the maximum permissible temperature at which the coil is not burning from the reference temperature.

Figure 3:
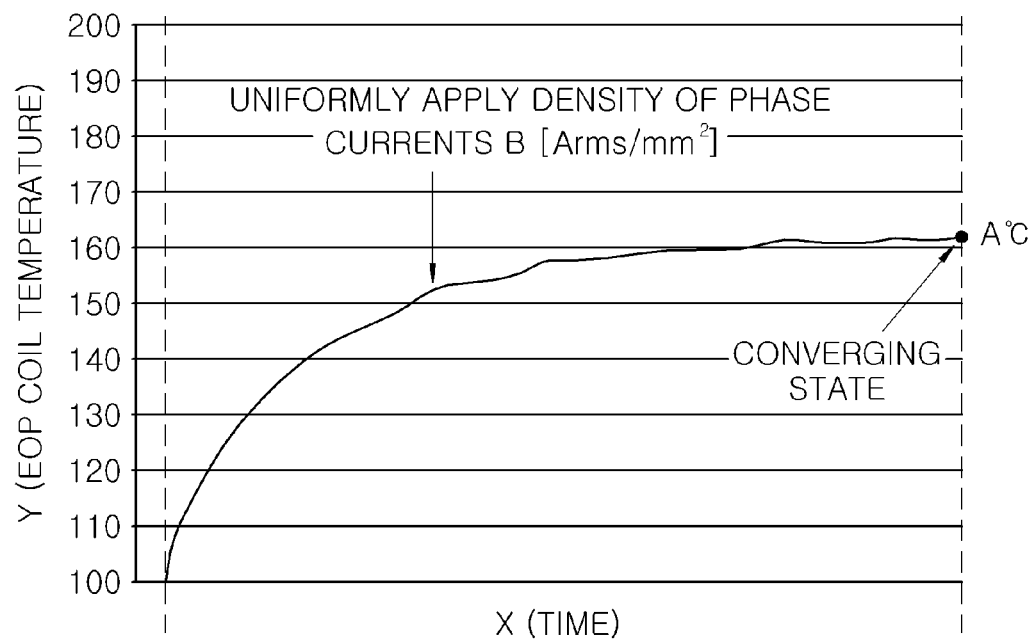
FIG. 3 is a graph illustrating the relationship between temperature in the coil and a time period.

FIG. 3 is a graph illustrating the relationship between the temperature in the coil and the time period.

An X axis indicates a time period and a Y axis indicates the temperature of a coil. It is assumed that the maximum permissible temperature at which the coil is not burning is "A° C.". Further, when uniform phase currents flow through the coil, it is assumed that the value of the density of phase currents, acquired when the temperature of the coil converges on "A° C.", is "B Arms/mm²".

Further, it is assumed that the mean density of phase currents acquired before shifting gear stages is "C Arms/mm²", that the mean density of phase currents acquired after shifting the gear stages is "D Arms/mm²", that temperature on which the temperature of the coil converges when the mean density of phase currents "C Arms/mm²" is uniformly applied to the coil is "E° C.", and that temperature on which the temperature of the coil converges when the mean density of phase currents "D Arms/mm²" is uniformly applied to the coil is "PC".

The mean density of phase currents acquired after shifting the gears of the vehicle is compared with the density of coil phase currents which flow through the coil at the maximum permissible temperature at which the coil is not burning at phase current density comparison step S20. It is preferable to use the mean value of the density of phase currents, acquired when the gear stages are shifted, as the mean density of phase currents.

The value of torque to be applied to the transmission is controlled according to a result, acquired at phase current density comparison step, at torque control step S30. The process will be described in detail below.

When the mean density of phase currents acquired after shifting the gears of the vehicle is less than the density of coil phase currents, the torque to be applied to the transmission is not restricted at step S31.

The reason for this is that, when the mean density of phase currents, measured based on phase currents which flow through the coil after shifting the gears of the vehicle, is less than the density of coil phase currents based on currents which can flow through the coil while not causing the coil to be burning, it is possible to protect the transmission even when the torque to be applied to the transmission is not restricted.

When the mean density of phase currents "D" acquired after shifting the gears of the vehicle is less than the density of coil phase currents "C", it is not necessary to restrict the torque to be applied to the transmission.

When the mean density of phase currents acquired after shifting the gears of the vehicle is greater than the density of coil phase currents, the torque to be applied to the transmission is not restricted for a set permissible time period G. Here, the set permissible time period is a time period taken to reach the maximum permissible temperature of the coil from the reference temperature, and the reference temperature includes temperature on which the temperature of the coil converges when the density of phase currents based on the value of phase currents, acquired when the gears are shifted from a Drive (D) stage to a Reverse (R) stage, is applied to the coil, or temperature on which the temperature of the coil converges when the density of phase currents based on the value of phase currents, acquired before shifting the gears, is applied to the coil.

A control procedure will be described in detail below.

When the mean density of phase currents acquired after shifting the gears of the vehicle is greater than the density of coil phase currents, a time period (permissible time period), during which the vehicle can travel while the torque to be applied to the transmission is not restricted for a predetermined time, is present as illustrated in attached <Table 1> of FIG. 2.

In particular, since the time period, during which the vehicle can travel while the torque to be applied to the transmission is not restricted, is present and the torque to be applied to the transmission is not restricted as long as the set permissible time period, it is possible to actively control the torque.

The set permissible time period G may include various time periods as shown in attached <Table 1> of FIG. 2, and a method for setting the permissible time period includes, first, setting the reference temperature. The reference temperature includes temperature on which the temperature of the coil converges when the density of phase currents based on the value of phase currents acquired when the maximum loads are generated in the EOP, that is, when the gears are shifted from the D stage to the R stage, or temperature on which the temperature of the coil converges when the density of phase currents based on the value of phase currents acquired before shifting the gears is applied to the coil.

In particular, even when the torque to be applied to the transmission is not restricted during the time period taken to reach the maximum permissible temperature "A° C." at which the coil is not burning from the temperature "E° C." on which the temperature of the coil converges when the density of phase currents "C Arms/mm$^2$" is uniformly applied to the coil, the transmission is prevented from being burning. Therefore, the torque to be applied to the transmission is not restricted for the set permissible time period, and thus it is possible to actively control the torque compared to the conventional art.

When a time period during which the density of phase currents "D" is applied is shorter than the permissible time period G, the torque to be applied to the transmission is not restricted for the time period G as described above. However, when the time period during which the density of phase currents "D" is applied is longer than the permissible time period G, it is necessary to restrict the torque to be applied to the transmission in order to protect the transmission.

In particular, when the time period during which the density of phase currents "D" is applied is longer than the permissible time period G, temperature at which the coil can stand is exceeded. Therefore, in this case, the torque to be applied to the transmission is controlled by reducing the mean density of phase currents acquired after shifting the gears of the vehicle, compared to the density of coil phase currents.

Since the density of phase currents is generally proportional to the torque to be applied to the transmission, it is possible to control the torque to be applied to the transmission by controlling the mean density of phase currents acquired after shifting the gears of the vehicle. The mean density of phase currents acquired after shifting the gears of the vehicle is controlled using the OPU for controlling the EOP.

It is assumed that the value of loads given to the EOP when the density of coil phase currents is applied to the coil is "H Nm". When the permissible time period, during which it is not necessary to restrict the torque to be applied to the transmission, elapses and a time period, during which the mean density of phase currents is applied to the coil after shifting the gear stages, is longer than the permissible time period, it is preferable to perform control such that torque to be applied to the transmission using the OPU is less than the value of loads given to the EOP.

Further, if the torque to be applied to the transmission is unlimitedly restricted, the range of the torque to be applied to the transmission is restricted. Therefore, it is preferable that a time period during which the torque to be applied to the transmission be restricted during a time period during which the torque is less than the value of loads I acquired when the vehicle generally travels.

Figure 4:
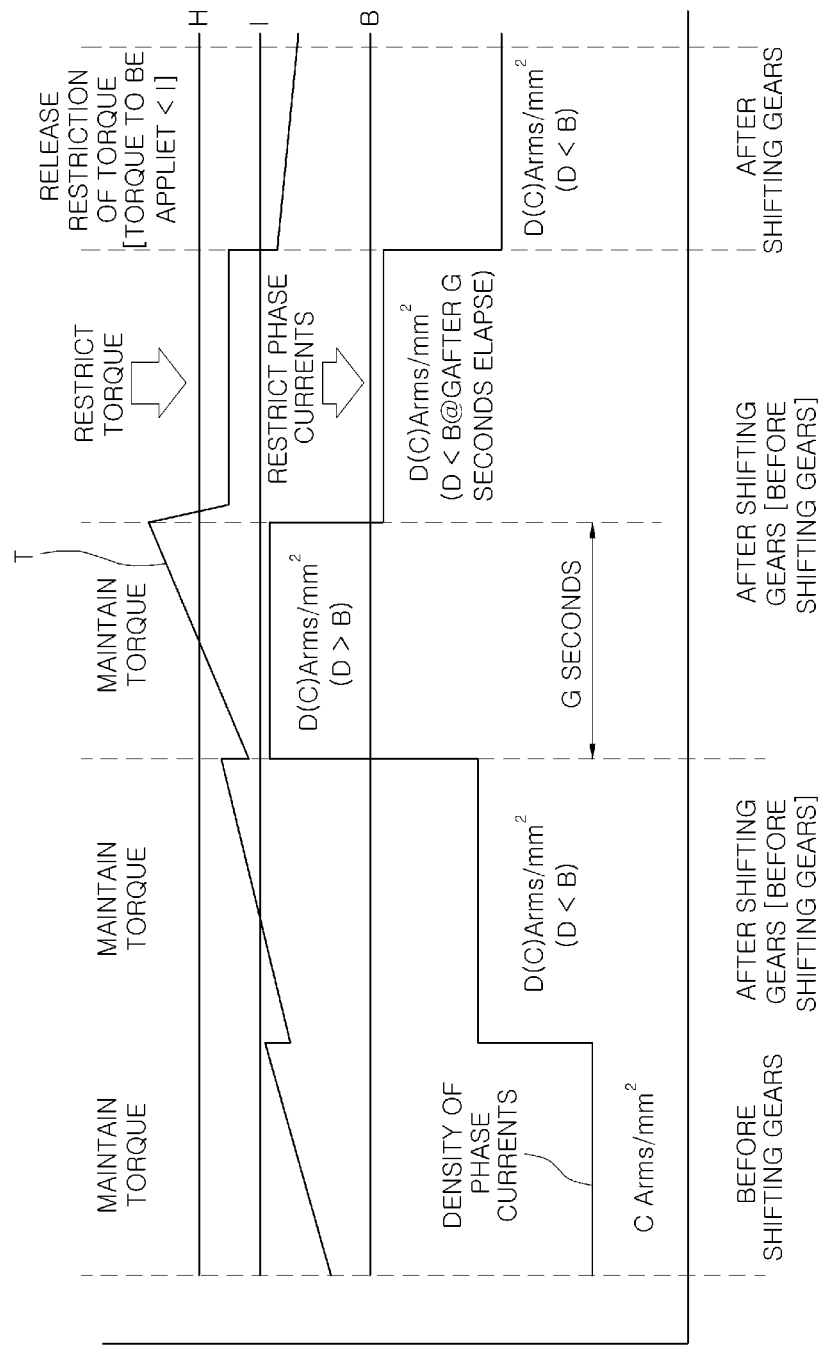
FIG. 4 is a graph illustrating a control procedure according to the present invention.

FIG. 4 is a graph illustrating a control procedure according to an embodiment of the present invention, and the control procedure will be described with reference to FIG. 4 below.

When it is determined that the OPU normally operates, failure has occurred in the EOP temperature sensor, and the density of phase currents "C" acquired before shifting the gear stages is applied to the coil, the density of phase currents is less than density of coil phase currents "B" applied to the coil at the maximum permissible temperature at which the coil is not burning and the torque "T" to be applied to the transmission is also less than the value of loads "H" given to the EOP when the density of coil phase currents "B" is applied, with the result that there is not a problem in that the transmission is burning, and thus the torque to be applied to the transmission is maintained.

If the gears of the vehicle are shifted after some time periods elapse, the torque to be applied to the transmission also increases, and it is determined that D<B when the density of phase currents "D", applied to the coil and acquired after shifting the gears, is compared with the density of coil phase currents "B", the torque 'T' to be applied to the transmission is still less than the value of loads "H" given to the EOP, with the result that there is not the problem in that the transmission is burning, and thus the torque to be applied to the transmission is maintained.

If it is determined that D>B when the density of phase currents "D" acquired after shifting the gears is compared with the density of coil phase currents "B", there is a case in which the torque to be applied to the transmission is greater than the value of load "H" given to the EOP within a predetermined range. However, since the torque to be applied to the transmission is not restricted and the transmission is not burning for previously set permissible time period G, it is still not necessary to restrict the torque to be applied to the transmission.

However, when a time period, during which the density of phase currents "D" is applied to the coil, is longer than the permissible time period G, there is a possibility that the transmission is burning, and thus the torque to be applied to the transmission is restricted by restricting the phase currents to be applied to the coil.

In particular, after the permissible time period G elapses, the OPU transmits a predetermined signal for causing the density of phase currents based on the phase currents applied to the coil to be less than the density of coil phase currents, and thus control is performed such that the torque "T" to be applied to the transmission is less than the value of loads "H" given to the EOP.

The torque to be applied to the transmission is not unlimitedly restricted. Restriction is performed until the torque to be applied to the transmission is less than the value of load "I" under the condition of general vehicle travelling, and thus the torque to be applied to the transmission is actively controlled.

Figure 5:
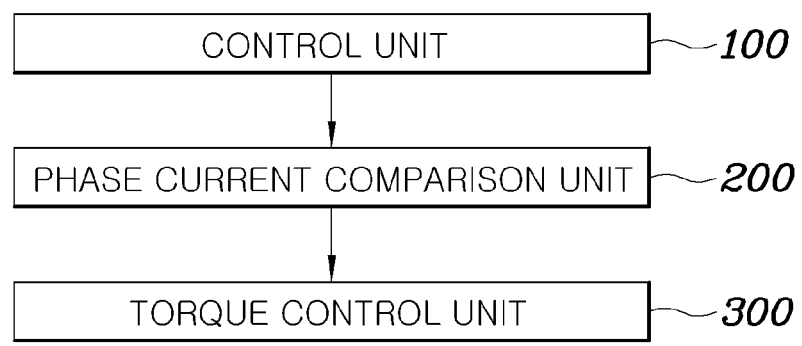
FIG. 5 is a diagram illustrating a system for controlling a hybrid electric vehicle according to the present invention.

FIG. 5 is a diagram illustrating the whole configuration of the system for controlling the hybrid electric vehicle according to the present invention.

As shown in the drawing, the system for controlling a hybrid electric vehicle according to the present invention includes a control unit 100 for determining whether or not an OPU and an EOP temperature sensor are normally operated;

a phase current density comparison unit 200 for comparing the mean density of phase currents acquired after shifting the gears of the vehicle with the density of coil phase currents which flow through coil at the maximum permissible temperature at which the coil is not burning; and a torque control unit 300 for controlling the value of torque to be applied to a transmission according to a result acquired by the phase current density comparison unit.

As described above, the torque control unit 300 transmits a restriction signal to the OPU such that the torque to be applied to the transmission is not restricted when the mean density of phase currents acquired after shifting the gears of the vehicle is less than the density of coil phase currents and such that the torque to be applied to the transmission is not restricted for a set permissible time period when the mean density of phase currents acquired after shifting the gears of the vehicle is greater than the density of coil phase currents.

It is apparent that the permissible time period is a time period taken to reach the maximum permissible temperature at which the coil is not burning from the set reference temperature, and the reference temperature includes the temperature on which the temperature of the coil converges when the density of phase currents based on the value of phase currents acquired when the gears are shifted from the D stage to the R stage is applied to the coil, or the temperature on which the temperature of the coil converges when the density of phase currents based on the value of phase currents acquired before shifting the gears is applied to the coil.

Further, as described above, when a time period during which the mean density of phase currents acquired after shifting the gears of the vehicle is applied to the coil is longer than the permissible time period, the torque to be applied to the transmission is controlled by imposing a restriction such that the mean density of phase currents acquired after shifting the gears of the vehicle is less than the density of coil phase currents using the OPU. A restriction is imposed such that torque less than loads given to the EOP is applied when the density of coil phase currents is applied to the coil through the OPU, and the torque is restricted for a time period that the torque to be applied to the transmission is less than loads acquired when the vehicle generally travels.

Since the control relationship has already been described in detail, the description thereof will not be repeated here.

The method and system for controlling a hybrid electric vehicle according to the present invention which are configured as described above realize various advantages as follows:

First, there is an advantage in that, when failure has occurred in an internal temperature sensor of an EOP, the torque to be applied to a transmission is restricted for only a predetermined time period during which the density of phase currents is equal to or higher than a specific value, and thus the range of the torque to be applied to the transmission may be widened.

Second, there is an advantage in that, when it is necessary to restrict the torque to be applied to the transmission, the value of the torque can be actively controlled.

Third, there are various advantages in that, since a conventional sensor is used, additional cost is not generated and shift smoothness can be improved when a vehicle travels.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a hybrid electric vehicle, comprising:
    determining whether or not an Electric Oil Pump (EOP) temperature sensor is normally operated when an Oil Pump Unit (OPU) is normally operated;
    comparing a mean density of phase currents acquired after shifting gears of the vehicle with a density of coil phase currents which flow through a coil at a maximum permissible temperature at which the coil is not burning; and
    controlling a value of torque to be applied to a transmission according to a result of comparing the mean density of phase currents with the density of coil phase currents.

2. The method of claim 1, wherein the step of controlling the value of torque comprises applying an unrestricted amount of torque to the transmission when the mean density of phase currents acquired after shifting the gears of the vehicle is less than the density of coil phase currents.

3. The method of claim 1, wherein the step of controlling the value of torque comprises applying an unrestricted amount of torque to the transmission for a set permissible time period when the mean density of phase currents acquired after shifting the gears of the vehicle is greater than the density of coil phase currents.

4. The method of claim 3, wherein the permissible time period is a time period taken to reach the maximum permissible temperature, at which the coil is not burning, from a set reference temperature.

5. The method of claim 4, wherein the reference temperature comprises at least one of:
    a temperature on which the coil converges when the density of phase currents based on a value of phase currents acquired when the gears are shifted from a Drive (D) stage to a Reverse (R) stage is applied to the coil, and
    the temperature on which the coil converges when the density of phase currents based on the value of phase currents acquired before shifting the gears is applied to the coil.

6. The method of claim 5, further comprising:
    controlling the torque to be applied to the transmission by imposing a restriction such that the mean density of phase currents acquired after shifting the gears of the vehicle is less than the density of coil phase currents using the OPU when a time period during which the mean density of phase currents acquired after shifting the gears of the vehicle is applied to the coil is longer than the permissible time period.

7. The method of claim 6, further comprising:
    imposing a restriction such that torque less than loads given to the EOP is applied when the density of coil phase currents is applied to the coil using the OPU.

8. The method of claim 7, further comprising:
    restricting the torque for a time period during which the torque to be applied to the transmission is less than loads acquired when the vehicle generally travels.

9. A system for controlling a hybrid electric vehicle, comprising:
    a control unit for determining whether or not an Oil Pump Unit (OPU) and an Electric Oil Pump (EOP) temperature sensor are normally operated;
    a phase current density comparison unit for comparing a mean density of phase currents acquired after shifting gears of the vehicle with a density of coil phase currents which flow through a coil at a maximum permissible temperature at which the coil is not burning; and a torque control unit for controlling a value of torque to be applied to a transmission according to a result acquired by the phase current density comparison unit.

10. The system of claim 9, wherein the torque control unit transmits a restriction signal to the OPU such that the torque to be applied to the transmission is not restricted when the mean density of phase currents acquired after shifting the gears of the vehicle is less than the density of coil phase currents and such that the torque to be applied to the transmission is not restricted for a set permissible time period when the mean density of phase currents acquired after shifting the gears of the vehicle is greater than the density of coil phase currents.

11. The system of claim 10, wherein:
the permissible time period is a time period taken to reach the maximum permissible temperature at which the coil is not burning from a set reference temperature, and
the reference temperature comprises one of the temperature on which temperature of the coil converges when the density of phase currents based on a value of phase currents acquired when a D stage is shifted to an R stage is applied to the coil, and the temperature on which the temperature of the coil converges when the density of phase currents based on the value of phase currents acquired before shifting the gears is applied to the coil.

12. The system of claim 11, wherein:
the torque to be applied to the transmission is controlled by imposing a restriction such that the mean density of phase currents acquired after shifting the gears of the vehicle is less than the density of coil phase currents using the OPU when a time period during which the mean density of phase currents acquired after shifting the gears of the vehicle is applied to the coil is longer than the permissible time period,
the restriction is imposed such that torque less than loads given to the EOP is applied when the density of coil phase currents is applied to the coil using the OPU, and
the torque is restricted for a time period during which the torque to be applied to the transmission is less than loads acquired when the vehicle generally travels.

* * * * *